Figure 1:
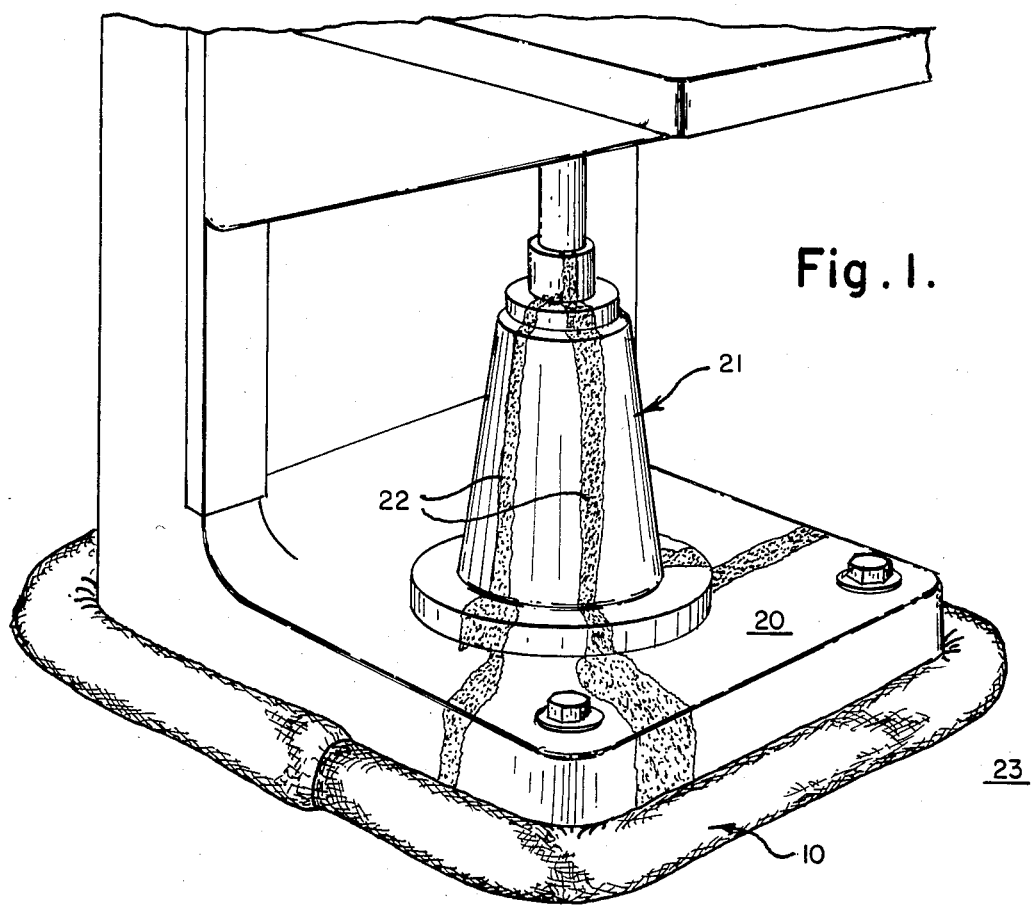

United States Patent [19]

Stapelfeld et al.

[11] Patent Number: 4,659,478
[45] Date of Patent: Apr. 21, 1987

[54] FLUID ABSORBING METHOD

[75] Inventors: Bernard E. Stapelfeld; Donald L. Beaver, Jr., both of Altoona, Pa.

[73] Assignee: Sermac Industries, Inc., Altoona, Pa.

[21] Appl. No.: 716,761

[22] Filed: Mar. 27, 1985

[51] Int. Cl.$^4$ ............................................. B01D 15/00
[52] U.S. Cl. .................................. 210/690; 210/924; 134/7
[58] Field of Search ............... 210/924, 690, 282, 484, 210/496, 502.1; 134/7

[56] References Cited

U.S. PATENT DOCUMENTS 3,494,862  2/1970  Horowitz ........................ 210/924 X
3,617,564  11/1971  Vander Hooven et al. ... 210/924 X
3,617,566  11/1971  Oshima et al. .................. 210/924 X
3,739,913  6/1973  Bogosian ......................... 210/924 X
4,366,067  12/1982  Golding et al. ................. 210/924 X Primary Examiner—Tom Wyse
Attorney, Agent, or Firm—Buell, Ziesenheim, Beck & Alstadt

[57] ABSTRACT

An oil absorbing member and method are provided including an elongate tubular member filled with a highly absorbent particulate material of capillary nature having a wicking action and closed at each end which can be arranged around a machine tool base as a continuous absorbing member.

5 Claims, 2 Drawing Figures

U.S. Patent  Apr. 21, 1987  4,659,478

FLUID ABSORBING METHOD

This invention relates to fluid absorbing means and particularly a fluid absorbing device having a natural wicking or capillary action to absorb fluids from a surface through the entire device.

The problem of leakage and spillage of oil and cutting fluids and solvents around machine tools has long been recognized. Over the years, a variety of expedients have been used in machine shops and other industrial plants in attempts to solve this problem. However, the one solution which has been generally accepted is that of spreading a thin layer of absorbing particles around the base of machine tools or other devices where leakage occurs. This is less than satisfactory and costly and time consuming. This practice is, however, the best and most accepted up to the present invention for the purpose.

There have been a variety of devices proposed for absorbing and flotation for the purpose of confining oil slicks. These devices are represented by U.S. Pat. Nos. 3,739,913; 3,617,565; 3,617,566; 3,598,729 and 3,791,990. These devices are designed primarily for flotation and confinement and secondarily for absorption. These devices have no wicking or capillary action but, on the contrary, capillary action is undesirable because of the sinking action which results on excessive pick up of oil and water.

We provide a method and apparatus for absorbing oil in the form of an elongate tubular fabric member, a highly porous absorbent material of capillary nature having a wicking action filling said tubular member and closure means for each end of said tubular member. The filled member is arranged around the base of a machine tool or other device to absorb oil or other fluid leakage and several such members can be arranged end to end by forcing an end of one into the end of the other. Preferably the tubular member is a relatively fine weave porous fabric such as cotton, rayon, nylon or like material. The highly absorbent porous material is preferably the ground core, sometimes called the "pith", of a corn cob, because of its excellent capillary and wicking action which permits an oil film to be picked up from the floor of a machine shop and transfer it from particle to particle within the tubular member until the entire mass of porous material is completely saturated. Other ground porous cellulose material having similar capillary or wicking action such as the ground pith and chaff of a corn cob can be used as the absorbent filler in the tubular member.

Figure 2:
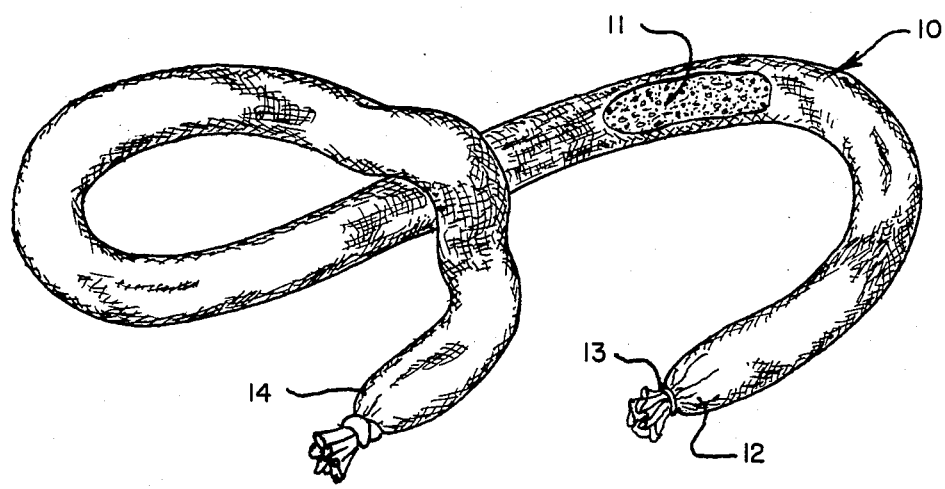

In the foregoing statement we have set out certain objects, purposes and advantages of this invention. Other objects, purposes and advantages of this invention will be apparent from the following description and the accompanying drawings in which:

FIG. 1 is a fragmentary isometric view of a machine tool base with the apparatus of this invention in place; and FIG. 2 is an isometric view, partly in section, of the apparatus of this invention.

Referring to the drawings, we have illustrated a woven tubular nylon or cotton sleeve or member 10 filled with granular corn cob core 11. Each end 12 of member 10 is preferably closed with a compressed metal hog ring 13. Other closure means may be used. For example, the opposite end 14 of sleeve 10 may be closed by simply knotting the end 14.

The invention is used, for example, as illustrated in FIG. 1, by placing the tubular member 10 around the base 20 of a machine tool 21, with the one end tucked into the other as shown. If more than one member 10 is necessary, the ends are tucked together to form a continuous ring around the tool base. Leaking oil or other fluid 22 coming from the tool 21 will run across the base 20 onto floor 23 at the edge of base 20 and will be absorbed into the granular material 11 without going onto the floor 23. This eliminates the problem of dangerous slippage of a workman around the machine tool. When filled, the tubular member is simply picked up and disposed of.

In the foregoing specification, we have set out certain preferred practices and embodiments of this invention, however, it will be understood that this invention may be otherwise embodied within the scope of the following claims.

We claim:

1. A method of controlling oil spills around a machine tool base comprising the steps of:
    (a) arranging at least one elongate tubular fabric member filled with a highly absorbent particulate material of capillary nature and wicking action around the boundary of the tool base, wherein the particulate material of capillary nature is ground corn cob cores and chaff;
    (b) interengaging the ends of said tubular member to form a continuous member around said tool base; and
    (c) lifting and replacing each tubular member as it becomes filled with absorbed oil.

2. A method as claimed in claim 1 wherein the tubular member is made of cotton fabric.

3. A method as claimed in claim 1 wherein the tubular member is made of nylon.

4. A method as claimed in claim 1 wherein the ends of the tubular member are closed, one end by a metallic ring and the other end by a knot in the tubular member.

5. A method as claimed in claim 1 wherein the ends of the tubular member are closed by a metallic ring.

* * * * *